US012417660B2

(12) United States Patent
Takeuchi et al.

(10) Patent No.: US 12,417,660 B2
(45) Date of Patent: Sep. 16, 2025

(54) METHOD FOR LEARNING MAPPING (71) Applicant: TOYOTA JIDOSHA KABUSHIKI KAISHA, Toyota (JP)

(72) Inventors: Shinichi Takeuchi, Nisshin (JP); Atsushi Tabata, Okazaki (JP); Shingo Noritake, Owariasahi (JP); Akira Murakami, Kasugai (JP); Ryo Yanagawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 18/330,467

(22) Filed: Jun. 7, 2023

(65) Prior Publication Data

US 2023/0419752 A1    Dec. 28, 2023

(30) Foreign Application Priority Data

Jun. 28, 2022 (JP) ................................ 2022-103603

(51) Int. Cl.
*G07C 5/08* (2006.01)
*G07C 5/00* (2006.01)

(52) U.S. Cl.
CPC ........... *G07C 5/0833* (2013.01); *G07C 5/008* (2013.01)

(58) Field of Classification Search
CPC .... G07C 5/0833; G07C 5/008; G07C 5/0841; G10L 25/51; G10L 21/02; G10L 25/03; G10L 25/27; G10L 25/48; G06N 20/00; H04L 41/16
USPC ...................................................... 701/29.1
See application file for complete search history.

(56) References Cited

U.S. PATENT DOCUMENTS

| | | | |
|---|---|---|---|
| 11,828,732 B1* | 11/2023 | Knas ....................... G07C 5/008 |
| 2006/0253282 A1* | 11/2006 | Schmidt ............... G07C 5/0808 |
| | | | 704/233 |
| 2007/0189546 A1* | 8/2007 | Togawa .................... G01H 3/08 |
| | | | 381/61 |
| 2010/0157080 A1* | 6/2010 | Kondo ..................... H04N 5/91 |
| | | | 348/222.1 |
| 2016/0292560 A1* | 10/2016 | Ayatollahi ......... G06K 19/0726 |
| 2019/0339688 A1* | 11/2019 | Cella ........................ H04L 1/18 |
| 2023/0012186 A1* | 1/2023 | Siegel .................. G07C 5/0833 |
| 2023/0419752 A1* | 12/2023 | Takeuchi .............. G07C 5/0833 |

FOREIGN PATENT DOCUMENTS

| | | |
|---|---|---|
| JP | 2004-286634 A | 10/2004 |
| JP | 2006-133115 A | 5/2006 |
| JP | 2007-199017 A | 8/2007 |
| JP | 2021-181945 A | 11/2021 |
| WO | WO 2020/026829 A1 | 2/2020 |

\* cited by examiner

*Primary Examiner* — Tyler D Paige
(74) *Attorney, Agent, or Firm* — Oblon, McClelland, Maier &Neustadt, L.L.P.

(57) ABSTRACT

A mapping, which is as a subject of learning, is a learning model that uses a sound signal as an input variable and outputs a variable indicating the cause of a sound in a vehicle. A learning method includes a signal correction process that corrects a sound signal by superimposing a noise signal on the sound signal, and an update process that updates the mapping through machine learning in which the sound signal corrected in the signal correction process serves as training data and a cause of a sound paired with the sound signal serves as teaching data.

3 Claims, 7 Drawing Sheets

METHOD FOR LEARNING MAPPING

BACKGROUND

1. Field

The following description relates to a method for learning a mapping specified by mapping data.

2. Description of Related Art

A known method identifies the cause of a sound by using a machine-learned mapping. In this method, when a sound signal related to a sound received by a microphone is input to a mapping as an input variable, the mapping outputs an output variable. Then, the cause of the sound is identified based on the output variable.

Japanese Laid-Open Patent Publication No. 2007-199017 discloses a method for removing noise from a sound signal related to a sound received by a microphone.

In an example, a microphone is installed in a passenger compartment of a traveling vehicle, and the cause of a sound received by the microphone is identified. In this case, various types of noise are superimposed on the sound signal related to the sound received by the microphone. Thus, it is difficult to stably remove such noise from a sound signal even if noise removal processing is performed on the sound signal by the method disclosed in the above patent publication. Accordingly, when a sound signal that underwent the noise removal processing is input to the mapping as the input variable to identify the cause of a sound based on the output variable of the mapping, the accuracy of the identification will have a tendency to vary.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for learning a mapping used to identify a cause of a sound in a vehicle based on a sound signal that is a signal related to a sound received by a microphone, where the mapping is a learning model that outputs a variable indicating the cause of the sound in the vehicle when the sound signal is input to the mapping as an input variable, includes executing, with processing circuitry, a signal correction process that corrects the sound signal by superimposing a noise signal on the sound signal, and executing, with the processing circuitry, an update process that updates the mapping through machine learning in which the sound signal corrected in the signal correction process serves as training data and the cause of the sound paired with the sound signal serves as teaching data.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of a method for learning a mapping will now be described with reference to FIGS. 1 to 9.

Figure 1:
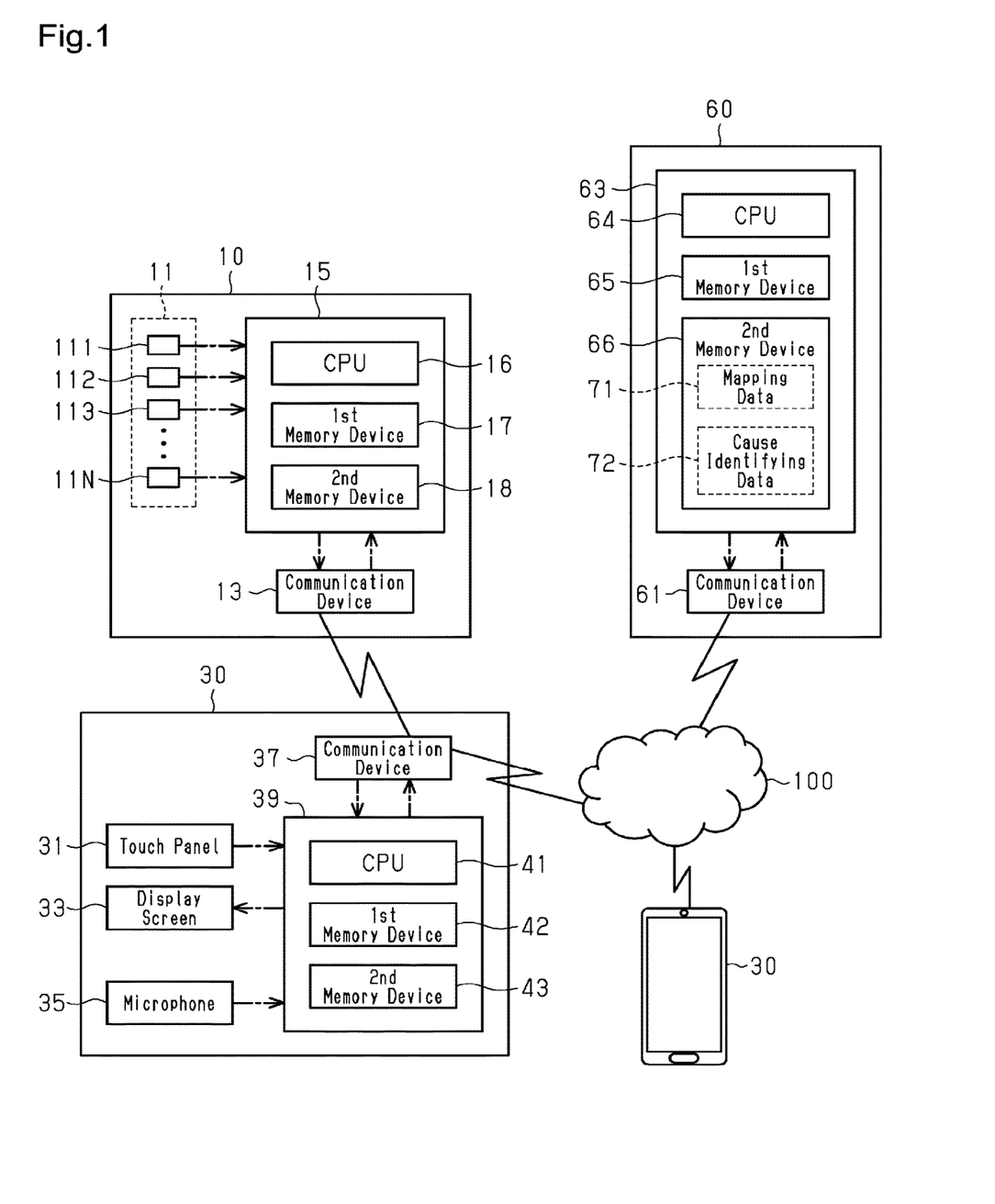
FIG. 1 is a block diagram showing the configuration of a system in accordance with an embodiment.

FIG. 1 shows a system including a vehicle 10, a mobile terminal 30, and a data analysis center 60. The mobile terminal 30 is carried by an occupant of the vehicle 10. The data analysis center 60 is located outside the vehicle 10.

Vehicle

The vehicle 10 includes a detection system 11, a communication device 13, and a vehicle controller 15.

The detection system 11 includes an N number of sensors 111, 112, 113, . . . , and 11N, where "N" indicates the number of sensors and is an integer of four or greater. The sensors 111 to 11N output signals corresponding to detection results to the vehicle controller 15. The sensors 111 to 11N include sensors that detect vehicle state quantities such as vehicle speed, acceleration, and the like, and sensors that detect amounts of operations performed by an occupant such as accelerator operation amount, brake operation amount, and the like. Further, the sensors 111 to 11N may include a sensor that detects the operation state of a drive device of the vehicle 10 such as an engine, an electric motor, and the like, and a sensor that detects the temperature of coolant, oil, and the like.

The communication device 13 establishes communication with the mobile terminal 30 that is located inside the passenger compartment of the vehicle 10. The communication device 13 outputs information received from the mobile terminal 30 to the vehicle controller 15 and transmits information output from the vehicle controller 15 to the mobile terminal 30.

The vehicle controller 15 controls the vehicle 10 based on output signals from the sensors 111 to 11N. Specifically, the vehicle controller 15 actuates a driving device, a braking device, a steering device, and the like of the vehicle 10 to control a traveling speed, an acceleration, a yaw rate, and the like of the vehicle 10.

The vehicle controller 15 includes a central processing unit (CPU) 16, a first memory device 17, and a second memory device 18. The first memory device 17 stores various control programs executed by the CPU 16. The first memory device 17 also stores vehicle type information related to the type, the grade, and the like of the vehicle 10. The second memory device 18 stores calculation results of the CPU 16 and the like.

Mobile Terminal

The mobile terminal 30 is, for example, a smartphone or a tablet terminal. The mobile terminal 30 includes a touch panel 31, a display screen 33, a microphone 35, a communication device 37, and a terminal controller 39. The touch panel 31 is a user interface arranged on the display screen 33. When the mobile terminal 30 is located inside the passenger compartment, the microphone 35 receives sound transmitted to the passenger compartment.

The communication device 37 has a functionality of establishing communication with the vehicle 10 when the mobile terminal 30 is located inside the passenger compartment of the vehicle 10. The communication device 37 outputs information received from the vehicle controller 15 to the terminal controller 39 and transmits information output from the terminal controller 39 to the vehicle controller 15.

Further, the communication device 37 has a functionality of establishing communication with another mobile terminal 30 and the data analysis center 60 via a global network 100. The communication device 37 outputs information received from another mobile terminal 30 or the data analysis center 60 to the terminal controller 39 and transmits information output from the terminal controller 39 to another mobile terminal 30 or the data analysis center 60.

The terminal controller 39 includes a CPU 41, a first memory device 42, and a second memory device 43. The first memory device 42 stores various control programs executed by the CPU 41. The second memory device 43 stores calculation results of the CPU 41 and the like.

Data Analysis Center

The data analysis center 60 identifies the cause of the sound received by the microphone 35. For example, there are an "M" number of causes of an abnormal sound in the vehicle 10, where "M" is an integer of two or greater. In this case, the data analysis center 60 selects one of the M number of cause candidates.

The data analysis center 60 includes a communication device 61 and a center controller 63.

The communication device 61 has a functionality of establishing communication with multiple mobile terminals 30 via the global network 100. The communication device 61 outputs information received from the mobile terminals 30 to the center controller 63, and transmits information output from the center controller 63 to the mobile terminals 30.

The center controller 63 includes a CPU 64, a first memory device 65, and a second memory device 66. The first memory device 65 stores various control programs executed by the CPU 64.

The second memory device 66 stores mapping data 71 that specifies a machine-learned mapping. The mapping is a pre-learned model that outputs a variable specifying the cause of a sound in the vehicle 10 when an input variable is input to the mapping. An example of the mapping is function approximating. For example, the mapping is a neural network of a fully-connected forward propagation type having one intermediate layer.

Output variable y of the mapping will now be described. As described above, there are an M number of candidates for the cause of an abnormal sound in the vehicle 10. Thus, when an input variable is input to the mapping, the mapping outputs an M number of output variables, namely, y(1), y(2), . . . , and y(M). Output variable y(1) is a value indicating the probability that the first one of the M number of cause candidates is the actual cause. Output variable y(2) is a value indicating the probability that the second one of the M number of cause candidates is the actual cause. Output variable y(M) is a value indicating the probability that the ordinal number of the M number of cause candidates is the actual cause.

The second memory device 66 stores cause identifying data 72. The cause identifying data 72 is data for identifying the cause of a sound in the vehicle 10 based on output variable y of the mapping. The cause identifying data 72 includes the M number of cause candidates. The first one of the M number of cause candidates corresponds to output variable y(1). The second one of the M number of cause candidates corresponds to output variable y(2). The ordinal number of the M number of cause candidates corresponds to output variable y(M).

Method for Identifying Cause of Abnormal Sound

Figure 2:
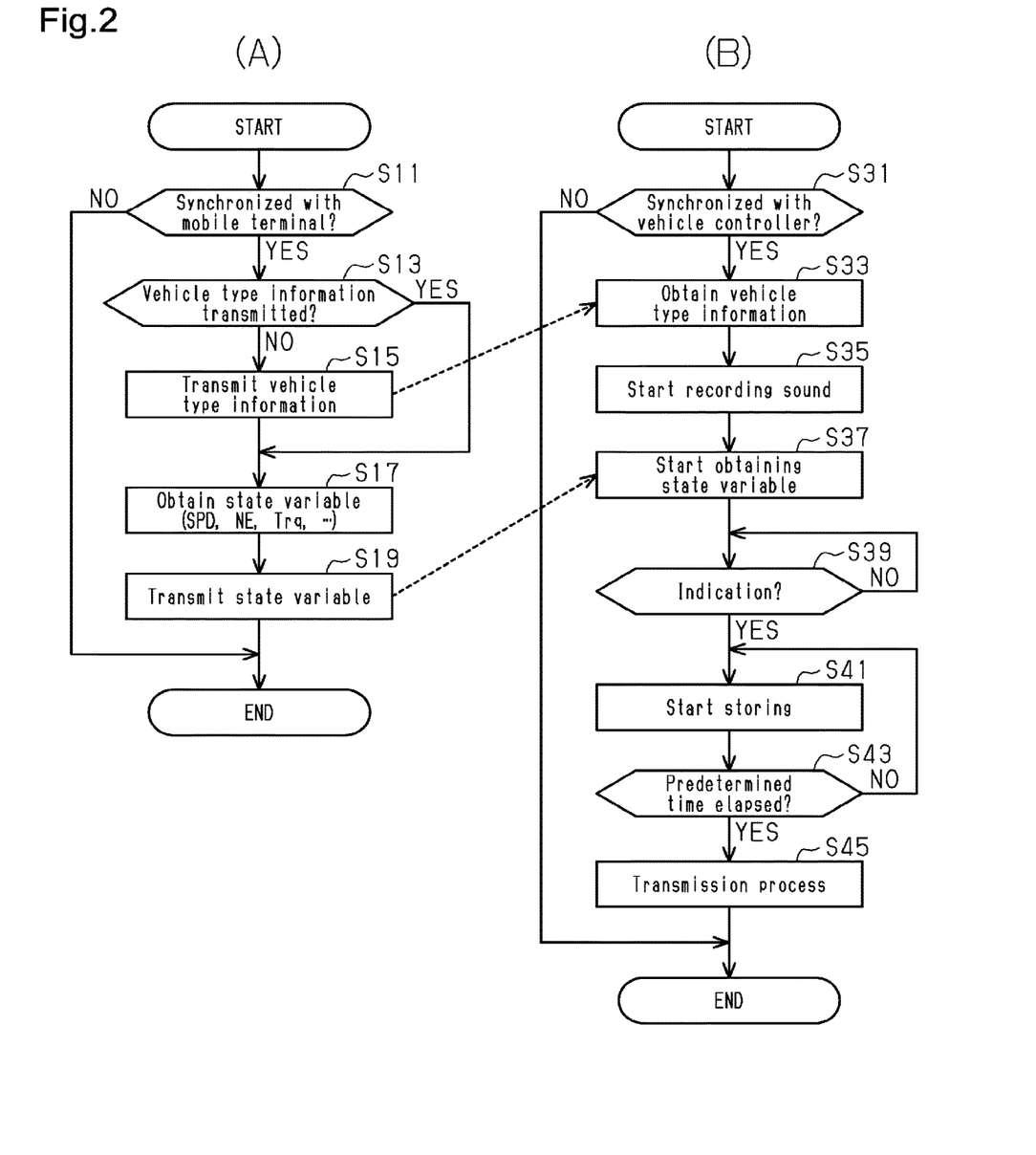
In FIG. 2, section (A) is a flowchart illustrating a series of processes executed by a vehicle controller, and section (B) is a flowchart illustrating a series of processes executed by a mobile terminal.

A method for identifying a cause will now be described with reference to FIGS. 2 to 4. Section (A) of FIG. 2 illustrates the flow of processes executed by the CPU 16 of the vehicle controller 15. When the CPU 16 executes the control program stored in the first memory device 17, the CPU 16 repeats the series of processes shown in section (A) of FIG. 2.

In step S11 of the series of processes shown in section (A) of FIG. 2, the CPU 16 determines whether the vehicle controller 15 and the mobile terminal 30 are synchronized. When the CPU 16 determines that the synchronization has been established (S11: YES), the CPU 16 proceeds to step S13. When the CPU 16 determines that the synchronization is not established (S11: NO), the CPU 16 temporarily ends processing.

In step S13, the CPU 16 determines whether the vehicle type information of the vehicle 10 is transmitted to the mobile terminal 30. When the vehicle type information has been transmitted to the mobile terminal 30 (S13: YES), the CPU 16 proceeds to step S17. When the vehicle type information is not transmitted to the mobile terminal 30 (S13: NO), the CPU 16 proceeds to step S15. In step S15, the CPU 16 transmits the vehicle type information from the communication device 13 to the mobile terminal 30. Then, the CPU 16 proceeds to step S17.

In step S17, the CPU 16 obtains the state variables of the vehicle 10. Specifically, the CPU 16 obtains detection values of the sensors 111 to 11N and processed values of the detection values as the state variables. For example, the CPU 16 obtains traveling speed SPD of the vehicle 10, acceleration G of the vehicle 10, engine speed NE, engine torque Trq, and the like.

In step S19, the CPU 16 transmits the obtained state variables of the vehicle 10 from the communication device 13 to the mobile terminal 30. Then, the CPU 16 temporarily ends processing.

Section (B) of FIG. 2 illustrates the flow of processes executed by the CPU 41 of the terminal controller 39. When the CPU 41 executes the control program stored in the first memory device 42, the CPU 41 repeats the series of processes shown in section (B) of FIG. 2.

In step S31 of the series of processes shown in section (B) of FIG. 2, the CPU 41 determines whether the mobile terminal 30 and the vehicle controller 15 are synchronized. When the CPU 41 determines that the synchronization has been established (S31: YES), the CPU 41 proceeds to step S33. When the CPU 41 determines that the synchronization is not established (S31: NO), the CPU 41 temporarily ends processing.

In step S33, the CPU 41 obtains the vehicle type information transmitted from the vehicle controller 15. In step S35, the CPU 41 starts recording sound with the microphone 35. In step S37, the CPU 41 starts obtaining the state variables of the vehicle 10 transmitted from the vehicle controller 15.

In step S39, the CPU 41 determines whether the occupant of the vehicle 10 is indicating that he or she is aware of an abnormal sound produced in the vehicle 10. For example, when the occupant performs a predetermined operation on the mobile terminal 30, the CPU 41 recognizes that the occupant is aware of an abnormal sound. When the occupant does not perform the predetermined operation on the mobile terminal 30, the CPU 41 recognizes that the occupant is not aware of an abnormal sound. When the CPU 41 determines that the occupant is indicating (S39: YES), the CPU 41 proceeds to step S41. When the CPU 41 determines that the occupant is not indicating (S39: NO), the CPU 41 continues to repeat step S39 until determining that an indication has been given.

Figure 3:
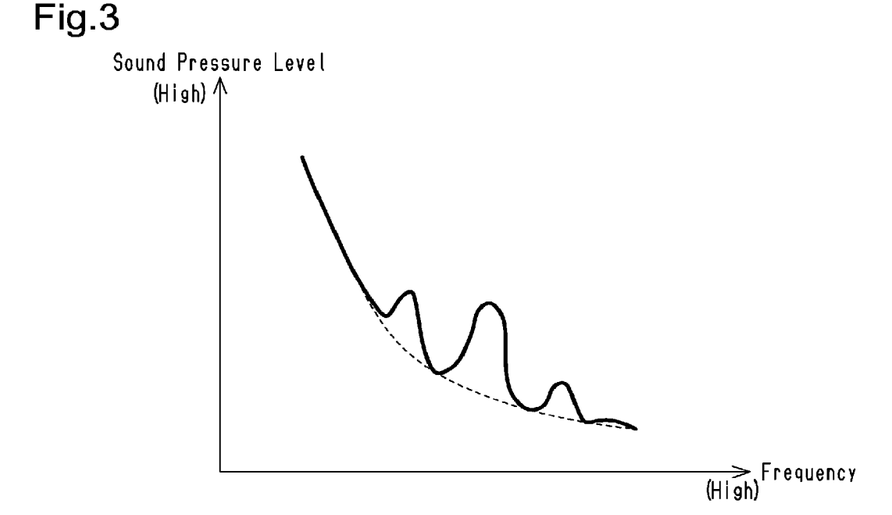
FIG. 3 is a diagram showing an example of a sound signal related to a sound received by a microphone of the mobile terminal.

FIG. 3 shows an example of an abnormal sound produced in the vehicle 10. When an abnormal sound, such as the one shown in FIG. 3, is produced, the occupant of the vehicle may feel uncomfortable. In this case, the occupant may perform the predetermined operation on the mobile terminal 30. Background noise is superimposed on the abnormal sound received by the microphone 35 as indicated by the broken line in FIG. 3. Background noise includes roadway noise, wind noise, and the like.

Returning to section (B) of FIG. 2, in step S41, the CPU 41 starts storing a sound signal that is a signal related to the sound received by the microphone 35 and the state variables of the vehicle 10 obtained from the vehicle controller 15. In this case, the CPU 41 links the sound signal and the state variables stored in the second memory device 43. In step S43, the CPU 41 determines whether a predetermined time elapsed from a time point at which it was determined that the occupant is aware of an abnormal sound. When the time elapsed from the time point has not reached the predetermined time, the CPU 41 determines that the predetermined time has not elapsed (S43: NO). Then, the CPU 41 returns to step S41. That is, the CPU 41 continues storing the sound signal and the state variables in the second memory device 43. When the time elapsed from the time point has reached the predetermined time, the CPU 41 determines that the predetermined time has elapsed (S43: YES). Then, the CPU 41 proceeds to step S45.

In step S45, the CPU 41 executes a transmission process. Specifically, in the transmission process, the CPU 41 transmits from the communication device 37 to the data analysis center 60 time series data of the sound signal and time series data of the state variables of the vehicle 10 stored in the second memory device 43. Further, in the transmission process, the CPU 41 transmits from the communication device 37 to the data analysis center 60 the vehicle type information obtained in step S33. Upon completion of the transmission, the CPU 41 temporarily ends processing.

Figure 4:
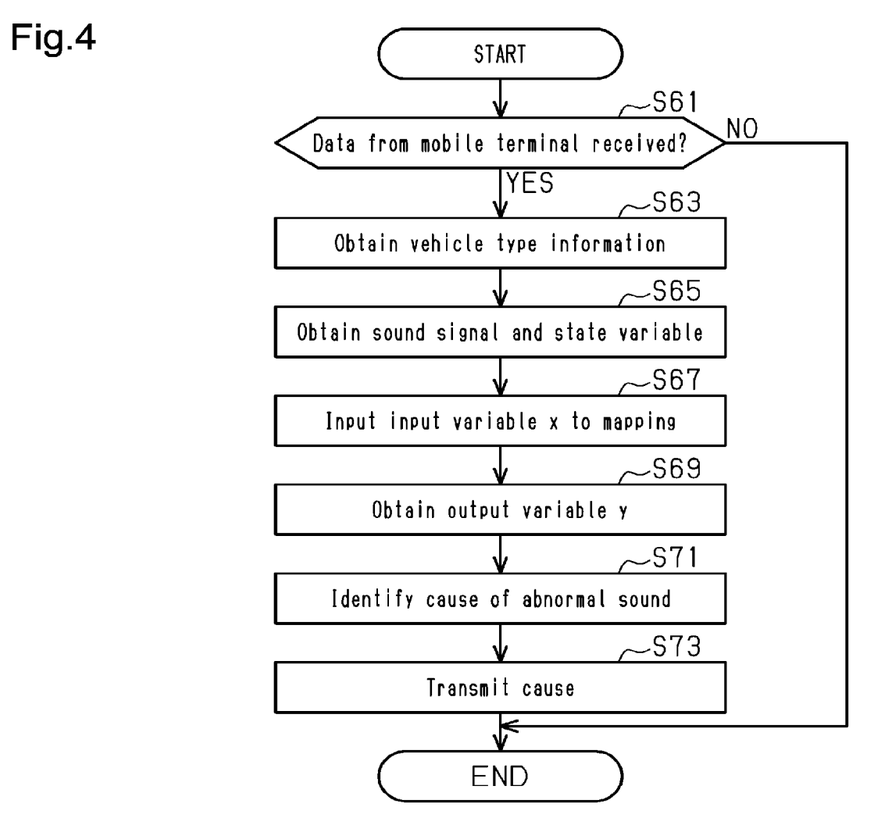
FIG. 4 is a flowchart illustrating a series of processes executed by a center controller.

FIG. 4 illustrates the flow of processes executed by the CPU 64 of the center controller 63. When the CPU 64 executes the control program stored in the first memory device 65, the CPU 64 repeats the series of processes shown in FIG. 4.

In step S61 of the series of processes, the CPU 64 determines whether the communication device 61 received the data transmitted from the mobile terminal 30 to the data analysis center 60 in step S45. When the communication device 61 has received the data (S61: YES), the CPU 64 proceeds to step S63. When the communication device 61 has not received the data (S61: NO), the CPU 64 temporarily ends processing.

In step S63, the CPU 64 obtains the vehicle type information of the vehicle 10 received with the communication device 61. In step S65, the CPU 64 obtains the time series data of the sound signal and the time series data of the state variables of the vehicle 10 received with the communication device 61.

In step S67, the CPU 64 inputs the time series data of the sound signal and the time series data of the state variables of the vehicle 10 obtained in step S65 to the mapping as input variable x. Then, in step S69, the CPU 64 obtains output variable y from the mapping.

In step S71, the CPU 64 identifies the cause of the sound received by the microphone 35 based on output variable y obtained in step S69. Specifically, the CPU 64 selects the output variable having the largest value from the M number of output variables y(1), y(2), . . . , and y(M). Then, the CPU 64 uses the cause identifying data 72 to identify the candidate that corresponds to the selected output variable as the actual candidate for the cause.

In step S73, the CPU 64 transmits information related to the identified cause of the sound from the communication device 61 to the mobile terminal 30. Then, the CPU 64 temporarily ends processing.

When the CPU 41 of the terminal controller 39 obtains the information related to the cause of the sound transmitted from the data analysis center 60, the CPU 41 notifies the occupant of the cause of the sound indicated by the information. For example, the CPU 41 displays the cause on the display screen 33.

Method for Learning Mapping

Figure 5:
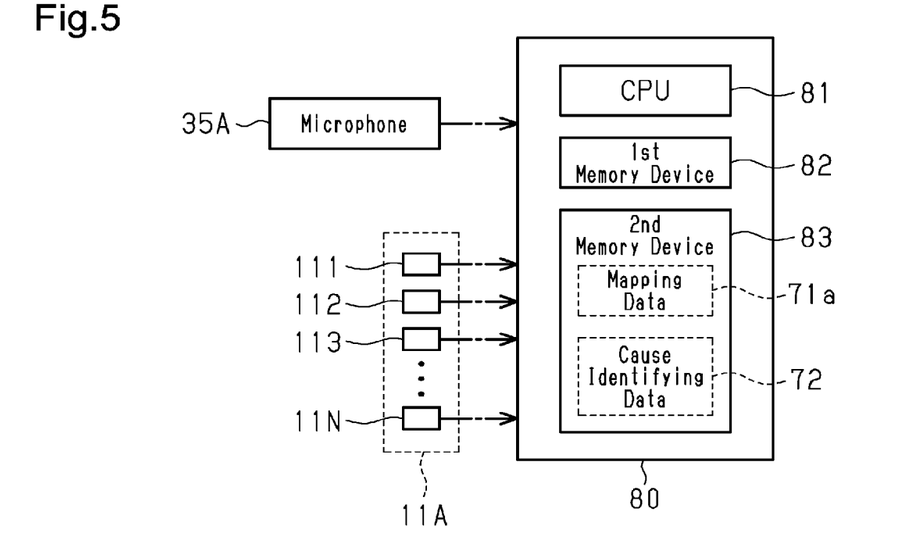
FIG. 5 is a block diagram showing the configuration of a learning device that performs machine learning on a mapping.

A learning device 80 that performs machine learning on the mapping will now be described with reference to FIG. 5.

A sound signal that is a signal related to the sound received by a microphone 35A is input to the learning device 80. Further, detection signals from a learning detection system 11A are input to the learning device 80. The sensors in the learning detection system 11A are of the same types as the sensors in the detection system 11 of the vehicle 10.

The learning device 80 includes a CPU 81, a first memory device 82, and a second memory device 83. The first memory device 82 stores a control program executed by the CPU 81. The second memory device 83 stores mapping data 71*a* and the cause identifying data 72. The mapping data 71*a* specifies a mapping. The mapping specified by the mapping data 71*a* is a learning model having incomplete machine learning.

Prior to the machine learning of the mapping, the learning device 80 obtains an L number of data pairs of training data and teaching data. The training data includes time series data of the sound signal related to the sound received by the microphone 35A and time series data of the state variables of the vehicle 10. The teaching data includes the causes of abnormal sound received by the microphone 35A.

Figure 8:
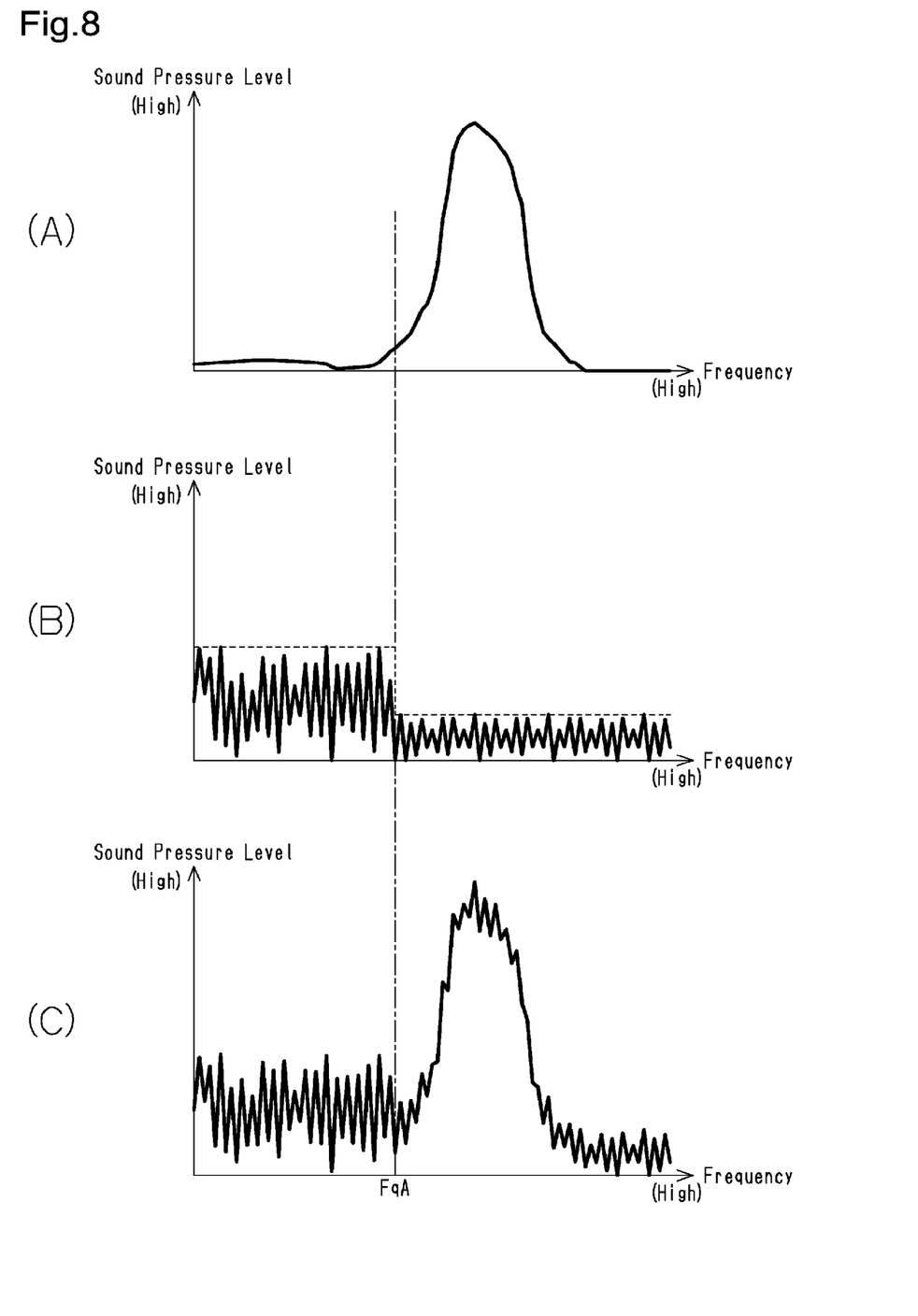
In FIG. 8, section (A) is a diagram of an uncorrected sound signal, section (B) is a diagram of the noise signal, and section (C) is a diagram of a corrected sound signal.

Section (A) of FIG. 8 shows an example of a sound signal related to the sound received by the microphone 35A. As shown in section (A) of FIG. 8, background noise is not superimposed on the sound signal related to the sound received by the microphone 35A. In other words, the microphone 35A receives sound that is free from background noise.

A flow of processes executed by the learning device 80 to perform machine learning on the mapping will now be described with reference to FIG. 6. In other words, the method for learning a mapping in accordance with the present embodiment includes having the CPU 81 of the learning device 80 execute a series of processes shown in FIG. 6. When the CPU 81 executes the control program stored in the first memory device 82, the CPU 81 repeats the series of processes.

Figure 6:
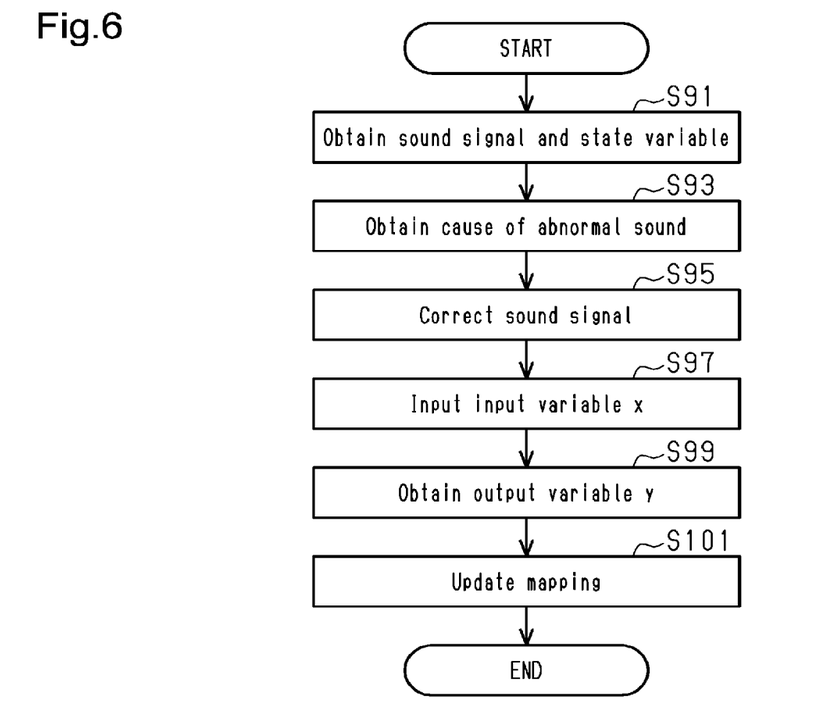
FIG. 6 is a flowchart illustrating an embodiment of a learning method.

As shown in FIG. 6, in step S91 of the series of processes, the CPU 81 obtains the time series data of the sound signal and the time series data of the state variables included in one of the L data pairs prepared in advance. In step S93, the CPU 81 obtains the cause of the abnormal sound that is paired with the time series data of the sound signal and the time series data of the state variables acquired in step S91.

In step S95, the CPU 81 corrects the time series of the sound signal obtained in step S91. Specifically, the CPU 81 superimposes a noise signal on the sound signal to correct the sound signal. Thus, step S95 corresponds to "signal correction process". The signal correction process will be described later.

When correction of the sound signal is completed, the CPU 81 proceeds to step S97. In step S97, the CPU 81 inputs the time series data of the sound signal corrected in step S95 and the time series data of the state variables obtained in step S91 to the mapping as input variable x. Then, in step S99, the CPU 81 obtains output variable y from the mapping.

In step S101, the CPU 81 updates the mapping using output variable y obtained in step S99 and the cause of the abnormal sound obtained in step S93. The cause of the abnormal sound obtained as the teaching data in step S93 is referred to as the "learning cause". For example, the CPU 81 selects the output variable having the largest value from the M number of output variables y(1), y(2), . . . , and y(M). The CPU 81 uses the cause identifying data 72 to select the candidate for the cause that corresponds to the selected output variable. When the selected candidate differs from the learning cause, the CPU 81 adjusts various variables in the function approximating of the mapping so that the one of output variables y(1) to y(M) corresponding to the learning cause becomes greater. For example, when the learning cause corresponds to the first cause candidate, the CPU 81 adjusts various variables in the function approximating of the mapping so that output variable y(1) becomes the greatest one of output variables y(1) to y(M). In the present embodiment, steps S97 to S101 correspond to "update process" that updates the mapping through machine learning in which the sound signal corrected in the signal correction process is used as the training data and the cause of the abnormal sound that is paired with the sound signal is used as the teaching data.

When the mapping is updated, the CPU 81 temporarily ends processing. In the present embodiment, the CPU 81 changes the data pair used for updating the mapping and executes the series of processes again. In other words, the CPU 81 executes the series of processes for an L number of times.

The signal correction process will now be described with reference to FIGS. 7 and 8.

Figure 7:
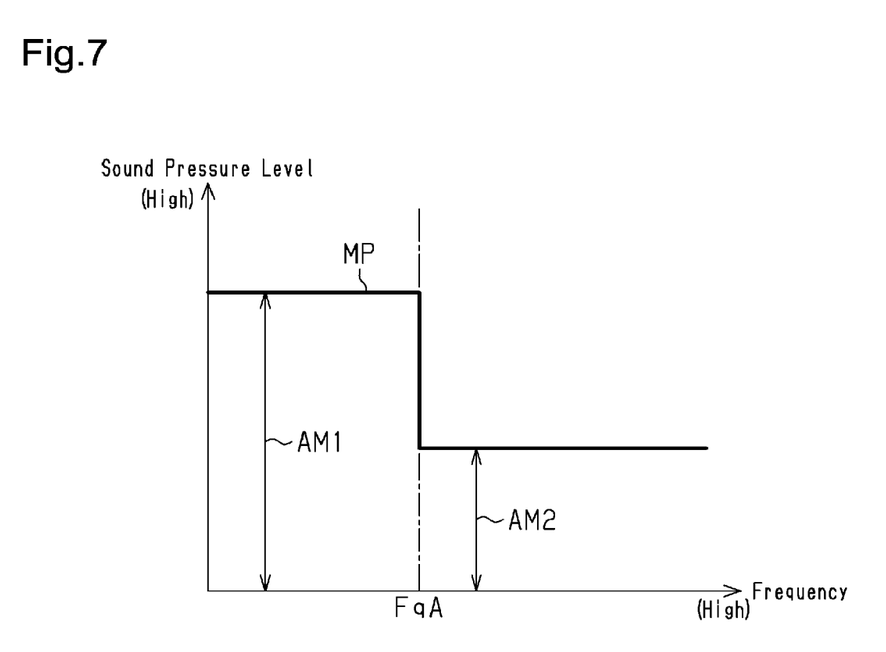
FIG. 7 is a diagram of a map for determining an amplitude of a noise signal.

FIG. 7 shows an example of a map MP for determining the amplitude of a noise signal superimposed on a sound signal. Section (A) of FIG. 8 shows a raw sound signal, which is an uncorrected sound signal. Section (B) of FIG. 8 shows an example of a noise signal superimposed on the raw sound signal. Section (C) of FIG. 8 shows a corrected sound signal.

The CPU 81 uses the map MP to set the amplitude of the noise signal. The CPU 81 changes the amplitude of the noise signal depending on the frequency. Specifically, the CPU 81 increases the amplitude of a portion of the noise signal having a frequency lower than or equal to a specified frequency FqA to become greater than the amplitude of a portion of the noise signal having a frequency higher than the specified frequency FqA. In the present embodiment, the frequency range lower than or equal to the specified frequency FqA corresponds to "first frequency range", and the frequency range higher than the specified frequency FqA corresponds to "second frequency range". In this case, the amplitude of the noise superimposed on a portion of a sound signal in the first frequency range becomes greater than the amplitude of the noise superimposed on a portion of the sound signal in the second frequency range.

Further, the CPU 81 superimposes noises having different amplitudes on the portion of a sound signal in the first frequency range. The amplitude of the noise signal in the first frequency range set by the map MP is referred to as "first amplitude AM1". In this case, as shown in section (B) of FIG. 8, the CPU 81 changes the amplitude of the noise signal so as not to exceed the first amplitude AM1. For example, the CPU 81 randomly changes the amplitudes of the noise signals so that the amplitude of a noise signal in a first cycle differs from the amplitude of a noise signal in a second cycle following the first cycle. In other words, the CPU 81 sequentially superimposes noises having different amplitudes on the portion of a sound signal in the first frequency range.

In the same manner, the CPU 81 superimposes noises having different amplitudes on the portion of a sound signal in the second frequency range. The amplitude of the noise signal in the second frequency range set by the map MP is referred to as "second amplitude AM2". In this case, as shown in section (B) of FIG. 8, the CPU 81 changes the amplitude of the noise signal so as not to exceed the second amplitude AM2. For example, the CPU 81 randomly changes the amplitudes of the noise signals so that the amplitude of a noise signal in a third cycle differs from the amplitude of a noise signal in a fourth cycle following the third cycle.

The CPU 81 generates noise signals such that the average value of the amplitudes of the noises superimposed on the portion of a sound signal in the first frequency range is greater than the average value of the amplitudes of the noises superimposed on the portion of a sound signal in the second frequency range.

Then, the CPU 81 superimposes the noise signal shown in section (B) of FIG. 8 on the raw sound signal shown in section (A) of FIG. 8 to generate the corrected sound signal shown in section (C) of FIG. 8.

If the raw sound signal has a relatively small peak value, the peak value of the actual abnormal sound may be embedded in the superimposed noise signal. Accordingly, it is preferred that the CPU 81 correct the amplitude of the noise signal in accordance with the peak value of the raw sound signal. This avoids the situation in which the peak value of the actual abnormal sound is embedded in the noise signal.

Method for Evaluating Mapping

Figure 9:
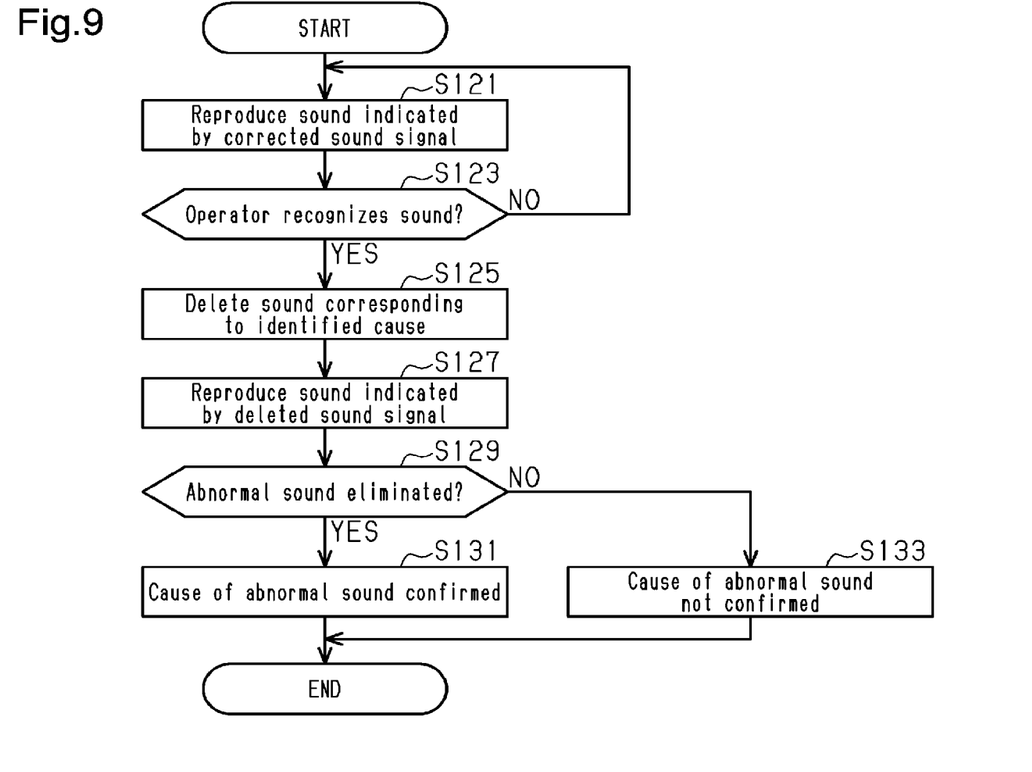
FIG. 9 is a flowchart illustrating a process that verifies whether an identified cause of an abnormal sound using the mapping is correct.

A method for evaluating the mapping that underwent the machine learning by the above learning method will now be described with reference to FIG. 9.

In the first step of S121, a sound indicated by the sound signal corrected in the step S95 is reproduced. In the next step of S123, it is determined whether an operator can recognize the reproduced sound. When the operator recognizes the reproduced sound (S123: YES), the process proceeds to step S125. When the operator does not recognize the reproduced sound (S123: NO), the process returns to step S121. That is, the sound is repeatedly reproduced until the operator recognizes the sound.

In step S125, a sound component that corresponds to the cause of the abnormal sound identified based on output variable y from the mapping is deleted from the raw sound signal. The sound signal generated in this manner is referred to as "the deleted sound signal".

In step S127, a sound indicated by the deleted sound signal is reproduced.

In step S129, the operator determines whether the abnormal sound has been eliminated in the reproduced sound. When the operator determines that the abnormal sound has eliminated in the reproduced sound (S129: YES), the process proceeds to step S131. When the operator determines that the abnormal sound has not been eliminated in the reproduced sound (S129: NO), the process proceeds to step S133.

In step S131, the cause of the abnormal sound is confirmed. In this case, the identified cause of the abnormal sound is correct.

In step S133, the cause of the abnormal sound is not confirmed. In this case, the identified cause of the abnormal sound is incorrect. Thus, it is preferred that the map MP shown in FIG. 7 be modified and then the machine learning described with reference to FIG. 6 be performed on the mapping again. The map MP may be modified by changing the specified frequency FqA and/or changing at least one of the first amplitude AM1 and the second amplitude AM2.

Operation and Advantage of Present Embodiment (1) The microphone 35 disposed in the passenger compartment of the vehicle 10 receives background noise in addition to an abnormal sound produced in the vehicle 10. Thus, when identifying the cause of the abnormal sound produced in the vehicle 10, a sound signal including the background noise component is input to the mapping.

Accordingly, in the present embodiment, a noise signal is intentionally superimposed on a raw sound signal, which is a sound signal related to the sound received by the microphone 35A, to generate a corrected sound signal as shown in section (C) of FIG. 8. Then, when the mapping undergoes machine learning, the corrected sound signal is input to the mapping as input variable x. In other words, the sound signal used as the training data includes a signal component corresponding to the background noise component.

Therefore, when a sound signal related to the sound received by the microphone 35 is input to the machine-learned mapping and the cause of the sound is identified based on output variable y of the mapping, the background noise has little effect on the accuracy in identifying the cause of the sound. In this manner, the mapping generated has a stable accuracy in identifying the cause of the sound even when the sound received by the microphone 35 includes background noise.

(2) As shown in FIG. 3, the inventors of the present invention found that the sound pressure level of background noise received by the microphone 35 has a tendency to increase in a lower frequency region. Accordingly, in the present embodiment, the amplitude of a noise signal superimposed on a raw sound signal is increased in the low frequency region to become greater than the amplitude of the noise signal in the high frequency region. This brings the frequency characteristic of the sound signal corrected in the signal correction process closer to the frequency characteristic of a sound signal related to the sound received by the microphone 35 disposed in the passenger compartment of the vehicle 10. In this manner, when the mapping is updated using the sound signal corrected in the signal correction process, the map generated has a stable accuracy in identifying the cause of the sound.

(3) The center controller 63 stores the mapping data 71 that specifies a mapping generated by the above learning method. When a sound signal related to the sound received by the microphone 35 is input to the mapping as input variable x, the cause of the abnormal sound is identified based on output variable y of the mapping. This allows for an accurate identification of the cause of a sound even when the sound signal input to the mapping as input variable x includes a background noise component.

MODIFIED EXAMPLES

The above embodiment may be modified as follows. The above embodiment and the following modifications can be combined as long as the combined modifications remain technically consistent with each other.

In the signal correction process, the amplitude of a noise signal does not have to be set by using the map MP shown in FIG. 7. For example, in the signal correction process, the CPU 81 may use map MP1 indicated by the solid line shown in FIG. 10 to set the amplitude of a noise signal. Alternatively, the CPU 81 may use map MP2 indicated by the single-dashed line shown in FIG. 10 to set the amplitude of a noise signal. In these cases, the CPU 81 generates a noise signal having the amplitude that gradually decreases as the frequency increases. Even in such cases, it is preferable that the amplitude of the noise signal superimposed on the portion of the sound signal in the first frequency range be greater than the amplitude of the noise signal superimposed on the portion of the sound signal in the second frequency range.

Figure 10:
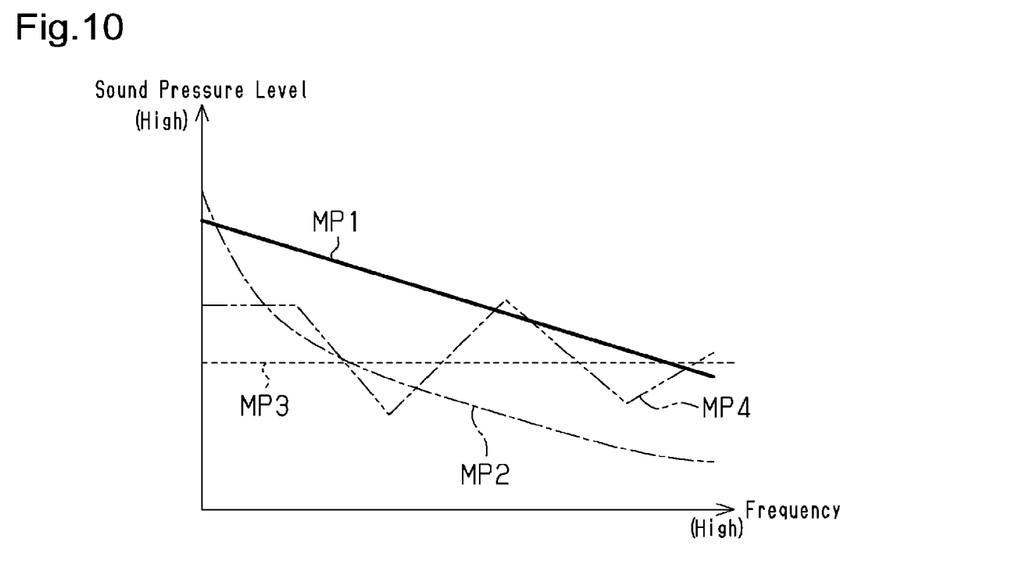
FIG. 10 is a diagram showing a modified example of the map for determining the amplitude of the noise signal.

Further, for example, the CPU 81 may use map MP3 indicated by the broken line shown in FIG. 10 to set the amplitude of the noise signal. In this case, the CPU 81 generates a noise signal having a fixed amplitude regardless of the frequency.

Further, for example, the CPU 81 may use map MP4 indicated by the double-dashed line shown in FIG. 10 to set the amplitude of the noise signal.

In the above embodiment, noises having different amplitudes are superimposed on the portion of the sound signal in the first frequency range. However, there is no limitation to such a configuration. For example, the amplitudes of the noise signals superimposed on the portion of the sound signal in the first frequency range may be fixed.

In the above embodiment, noises having different amplitudes are sequentially superimposed on the portion of the sound signal in the second frequency range. However, there is no limitation to such a configuration. For example, the amplitudes of the noise signals superimposed on the portion of the sound signal in the second frequency range may be fixed.

The neural network is not limited to a feed-forward network having one intermediate layer. For example, the neural network may be a network having two or more intermediate layers, a convolutional neural network, or a recurrent neural network.

The machine-learned model does not have to be a neural network. For example, a support vector machine may be employed as the learned model.

The learning device 80 is not limited to a device that includes a CPU and a ROM and executes software processing. That is, the learning device 80 may have any one of the following configurations.

(a) The learning device 80 includes one or more processors that execute various processes in accordance with a computer program. Each processor includes a CPU and a memory, such as a RAM and a ROM. The memory stores program codes or commands that are configured to have the CPU execute processes. The memory, which is a computer readable medium, may be any available medium that is accessible by a versatile or dedicated computer.

(b) The learning device 80 includes one or more exclusive hardware circuits that execute various processes. Examples of the exclusive hardware circuit include an application specific integrated circuit (ASIC), a field programmable gate array (FPGA), and the like.

(c) The learning device 80 includes a processor that executes part of various processes in accordance with a computer program and an exclusive hardware circuit that executes the remaining processes.

That is, the above processes may be executed by processing circuitry including at least one of one or more processors and one or more exclusive hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for learning a mapping used to identify a cause of a sound in a vehicle based on a sound signal that is a signal related to a sound received by a microphone, wherein the mapping is a learning model that outputs a variable indicating the cause of the sound in the vehicle when the sound signal is input to the mapping as an input variable, the method comprising:

executing, with processing circuitry, a signal correction process that corrects the sound signal by superimposing a noise signal on the sound signal;

executing, with the processing circuitry, an update process that updates the mapping through machine learning in which the sound signal corrected in the signal correction process serves as training data and the cause of the sound paired with the sound signal serves as teaching data, wherein the signal correction process is a process that corrects the sound signal by superimposing the noise signal on a portion of the sound signal in a first frequency range and superimposing the noise signal on a portion of the sound signal in a second frequency range that is a higher frequency range than the first frequency range, an amplitude of the noise signal superimposed on the portion of the sound signal in the first frequency range is greater than an amplitude of the noise signal superimposed on the portion of the sound signal in the second frequency range, the training data includes the sound signal corrected in the signal correction process and at least one state variable of the vehicle corresponding to the corrected sound signal, the at least one state variable including at least one of a vehicle speed, an acceleration, an engine speed, an engine torque, or other sensor-derived operational data indicative of an operating condition of the vehicle, and the teaching data includes the cause of the sound paired with the sound signal corrected in the signal correction process, the cause of the sound being selected from a plurality of predefined candidate causes of abnormal vehicle sounds, each of the predefined candidate causes corresponding to a specific mechanical or operational source of the sound within the vehicle; and outputting, via an audio playback device, a reproduction of the corrected sound signal as an audible sound, wherein the reproduction is used by an operator to evaluate whether sound characteristics corresponding to the cause of the abnormal vehicle sound are present or have been eliminated.

2. The method according to claim 1, wherein:

the signal correction process includes superimposing noise signals having different amplitudes on the portion of the sound signal in the first frequency range; and the noise signals superimposed on the portion of the sound signal in the first frequency range have an average amplitude value greater than that of one or more noise signals superimposed on the portion of the sound signal in the second frequency range.

3. The method according to claim 2, wherein the signal correction process includes a process that superimposes noise signals having different amplitudes on the portion of the sound signal in the second frequency range.

* * * * *